(12) United States Patent
Yang et al.

(10) Patent No.: US 9,379,843 B2
(45) Date of Patent: Jun. 28, 2016

(54) TRANSMITTING APPARATUS AND RECEIVING APPARATUS AND SIGNAL PROCESSING METHOD THEREOF

(71) Applicant: SAMSUNG ELECTRONICS CO., LTD., Suwon-si (KR)

(72) Inventors: Hyun-koo Yang, Seoul (KR); Alain Mourad, Staines (GB); Sung-hee Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/476,952

(22) Filed: Sep. 4, 2014

(65) Prior Publication Data

US 2015/0063490 A1 Mar. 5, 2015

Related U.S. Application Data

(60) Provisional application No. 61/873,490, filed on Sep. 4, 2013, provisional application No. 61/876,874, filed on Sep. 12, 2013.

(30) Foreign Application Priority Data

May 15, 2014 (KR) .................. 10-2014-0058589

(51) Int. Cl.
  *H04L 27/00* (2006.01)
  *H04L 1/00* (2006.01)
  *H04H 20/33* (2008.01)
  *H04L 27/26* (2006.01)

(52) U.S. Cl.
  CPC ............. *H04L 1/0025* (2013.01); *H04H 20/33* (2013.01); *H04L 1/0007* (2013.01); *H04L 1/0057* (2013.01); *H04L 1/0071* (2013.01); *H04L 27/2602* (2013.01)

(58) Field of Classification Search
  None
  See application file for complete search history.

(56) References Cited

U.S. PATENT DOCUMENTS

| 2011/0055887 A1 | 3/2011 | Vare et al. |
| 2012/0314762 A1 | 12/2012 | Herrmann et al. |
| 2012/0327955 A1 | 12/2012 | Herrmann et al. |
| 2013/0291046 A1 * | 10/2013 | Ko et al. ................ 725/116 |

FOREIGN PATENT DOCUMENTS

| EP | 2536135 A2 | 12/2012 |
| WO | 2011099757 A2 | 8/2011 |

OTHER PUBLICATIONS

Search Report dated Dec. 18, 2014, issued by the International Searching Authority in counterpart International Application No. PCT/KR2014/008192.
Written Opinion dated Dec. 18, 2014, issued by the International Searching Authority in counterpart International Application No. PCT/KR2014/008192.

* cited by examiner

*Primary Examiner* — Adolf Dsouza
(74) *Attorney, Agent, or Firm* — Sughrue Mion, PLLC

(57) ABSTRACT

A transmitting apparatus including a frame generator configured to map data contained in an input stream to at least one signal processing path to generate a frame; an information inserter configured to insert signaling information in a signaling region of the frame; and a transmitter configured to transmit the frame in which the signaling information is inserted, wherein the signaling information comprises information on an input type of each of the at least one input stream and information on a type of data which is mapped to the at least one signal processing path.

20 Claims, 24 Drawing Sheets

FIG. 6A

```
...
for i=0..NUM_PLP {
...
  if (INPUT_TYPE == '11') {
    PLP_PAYLOAD_TYPE       ~611
  }
...
  PLP_MAI   ~612
  PLP_ISSYI ~613
...
}
```

FIG. 6B

```
...
for i=0..NUM_PLP {
...
    PLP_BUFS    ~621
    PLP_TTO     ~622
...
}
```

FIG. 6C

```
For i=0..NUM_PLP-1 {
...
PLP_PAYLOAD_TYPE (2 bits)
if (PLP_PAYLOAD_TYPE == '00') or (PLP_PAYLOAD_TYPE == '01'){
   PLP_MAI (1 bit)
   if (PLP_MAI == '1') {
      PLP_ISSYI(1 bit)
   }
}
...
}
```

FIG. 6D

```
For i=0..NUM_PLP-1 {
...
if (PLP_ISSYI=='1'){
   BUFS (32 bits)
   TTO (10 bits)
}
...
```

FIG. 6E

```
For i=0..NUM_PLP-1 {
...
PLP_PAYLOAD_TYPE (2 bits)
PLP_MAI (1 bit)
PLP_ISSYI(1 bit)
TTO (32 bits)
BUFS (10 bit)
...
}
```

FIG. 6F

```
For i=0..NUM_PLP-1 {
...
PLP_PAYLOAD_TYPE (2 bits)
if (PLP_PAYLOAD_TYPE == '00') or (PLP_PAYLOAD_TYPE == '01'){
  PLP_MAI (1 bit)
  if (PLP_MAI == '1') {
    PLP_ISSYI(1 bit)
    if (PLP_ISSYI=='1'){
      BUFS (32 bits)
      TTO (10 bits)
    }
  }
}
...
}
```

TRANSMITTING APPARATUS AND RECEIVING APPARATUS AND SIGNAL PROCESSING METHOD THEREOF

CROSS-REFERENCE TO RELATED APPLICATION(S)

This application claims priority from Korean Patent Application No. 10-2014-0058589, filed on May 15, 2014, in the Korean Intellectual Property Office, and from U.S. Provisional Application No. 61/873,490 filed on Sep. 4, 2013 and U.S. Provisional Application No. 61/876,874 filed on Sep. 12, 2013 in the United States Patent and Trademark Office, the disclosures of which are incorporated herein in their entirety by reference.

BACKGROUND

1. Field

Apparatuses and methods consistent with exemplary embodiments relate to a transmitter, receiver and controlling method thereof, and more particularly, to a transmitter which maps data to at least one signal processing path and then transmits the data, a receiver which receives the data, and controlling method thereof.

2. Description of the Related Art

In the information-oriented $21^{st}$ society, broadcasting communication services become more digitized, use more broadcast channels and wider broadbands, and achieve a better quality. In particular, recently, as a high definition digital television (TV), portable media player (PMP), and a portable broadcasting device are made popular, demands for supporting various reception methods of the digital broadcasting services have increased.

In response to such demands, standardization groups have established various standards to provide various services which can satisfy user needs. Therefore, ways for providing users with better services through higher signal transmission and reception performances are sought for.

SUMMARY

Exemplary embodiments provide a transmitting apparatus configured to constitute a stream so as to transmit various types of service data, and then, generate and transmit signaling information corresponding thereto, a receiving apparatus and a method controlling them.

According to an aspect of an exemplary embodiment, there is provided a transmitter which may include: a frame generator configured to map data contained in at least one input stream to at least one signal processing path to generate a frame, an information inserter configured to insert signaling information in a signaling region of the frame; and a transmitter configured to transmit the frame in which the signaling information is inserted. Here, the signaling information may include information on an input type of each of the at least one input stream and information on a type of data which is mapped to the at least one signal processing path.

The information on an input type may include information on whether all of signal processing paths in the frame are the same input type.

The information on the above input type may include information on at least one of a first input type in which all of signal processing paths in the frame transmit only a first type stream in a standalone mode, a second input type in which all of the signal processing paths transmit the first type stream and a second type stream which is different from the first type stream in a mixed mode, a third input type in which all of the signal processing paths transmit the second type stream in the mixed mode, and a fourth input type in which at least two processing paths transmit streams which are different from each other.

Here, the first type stream may be a transport stream (TS) and the second type stream may include an Internet packet (IP) stream.

The signaling information may further include at least one of information on whether to use a mode adaptation and information on an input stream synchronizer (ISSY) mode, when the at least one signal processing path includes a TS stream.

The signaling region may include a layer 1 (L1) pre signaling region and an L1 post signaling region, and the information on the input type may be included in the L1 pre signaling region, and the information on the data type may be included in the L1 post signaling region.

The L1 post signaling region may include a configurable field and a dynamic field, and the information on the data type may be included in the configurable field.

According to an aspect of another exemplary embodiment, there is provided a receiving apparatus which may include: a receiver configured to receive a frame comprising signaling information and data which is mapped to at least one signal processing path; a signaling processor configured to extract the signaling information from the received frame; and a signal processor configured to perform signal processing on the data included in the frame based on the extracted signaling information. Here, the signaling information may include information on an input type of each of the at least one input stream and information on a type of data which is mapped to the at least one signal processing path.

The information on the input type may include information on whether all of signal processing paths in the frame are the same input type.

The information on the input type may include information on at least one of a first input type in which all of signal processing paths in the frame transmit only a first type stream in a standalone mode, a second input type in which all of the signal processing paths transmit the first type stream and a second type stream which is different from the first type stream in a mixed mode, a third input type in which all of the signal processing paths transmit the second type stream in the mixed mode, and a fourth input type in which at least two processing paths transmit streams which are different from each other.

Here, the first type stream may be a TS stream and the second type stream may be an IP stream.

The signaling information may further include at least one of information on whether to use a mode adaptation and information on an ISSY mode, when the at least one signal processing path includes a TS stream.

According to an aspect of still another exemplary embodiment, there is provided a signal processing method which may include: mapping data contained in at least one input stream to at least one signal processing path to generate a frame; insert signaling information in a signaling region of the frame; and transmitting the frame in which the signaling information is inserted. Here, the signaling information may include information on an input type of each of the at least one input stream and information on a type of data which is mapped to the at least one signal processing path.

The information on the input type may include information on whether all of signal processing paths in the frame are the same input type.

The information on the input type may include information on at least one of a first input type in which all of signal processing paths in the frame transmit only a first type stream in a standalone mode, a second input type in which all of the signal processing paths transmit the first type stream and a second type stream which is different from the first type stream in a mixed mode, a third input type in which all of the signal processing paths transmit the second type stream in the mixed mode, and a fourth input type in which at least two processing paths transmit streams which are different from each other.

The first type stream may be a TS stream and the second type stream may be an IP stream.

The signaling information may further include at least one of information on whether to use a mode adaptation and information on an ISSY mode, when the at least one signal processing includes a TS stream.

The signaling region may include an L1 pre signaling region and an L1 post signaling region, and the information on the input type may be included in the L1 pre signaling region, and information on the data type may be included in the L1 post signaling region.

The L1 post signaling region may include a configurable field and a dynamic field, and the information on the data type may be included in the configurable field.

According to an aspect of still another exemplary embodiment, there is provided a signal processing method which may include: receiving a frame comprising signaling information and data which is mapped to at least one signal processing path; extracting the signaling information from the received frame; and performing signal processing on the data included in the frame based on the extracted signaling information. The signaling information may include information on an input type of each of the at least one input stream at a transmitter of the frame and information on a type of the data which is mapped to the at least one signal processing path.

According to the above exemplary embodiments, various information on signal processing paths, through which data included in a transmission frame are transmitted, are transmitted through L1 signaling, thereby improving performances of a receiving apparatus.

BRIEF DESCRIPTION OF THE DRAWINGS

The above and/or other aspects will be more apparent by describing certain exemplary embodiments with reference to the accompanying drawings, in which:

FIGS. 6A to 6F are diagrams illustrating an L1 post signaling region according to exemplary embodiments;

DETAILED DESCRIPTION OF THE EXEMPLARY EMBODIMENTS

Figure 1:
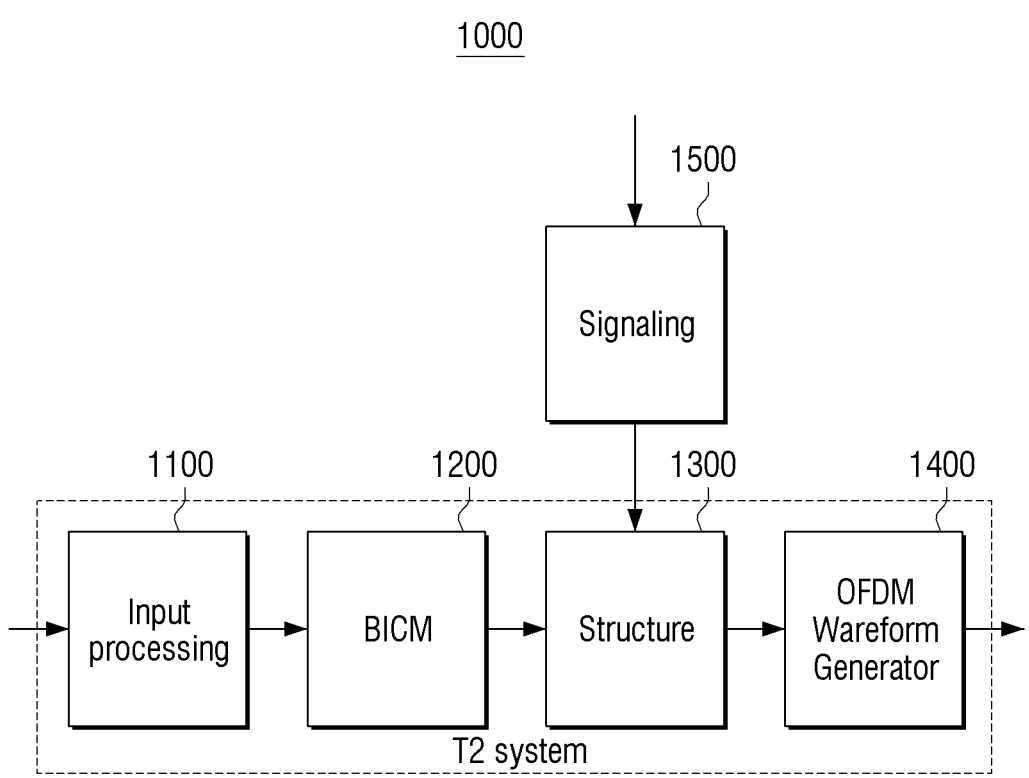
FIG. 1 is a block diagram provided to explain a configuration of a transmitting system according to an exemplary embodiment.

Hereinafter, exemplary embodiments of the inventive concept will be described in greater detail with reference to the accompanying drawings.

In the following description, same reference numerals are used for same elements when they are depicted in different drawings. The matters defined in the description, such as detailed construction and elements, are provided to assist a comprehensive understanding of the exemplary embodiments. Thus, it is apparent that other embodiments can be carried out without those specifically defined matters. Also, functions or elements known in the related art are not described in detail since they would obscure the exemplary embodiments described herein with unnecessary detail. Many of terms used in describing the exemplary embodiments herein may be referred to in the European standard of a second generation digital terrestrial television broadcasting system (DVB-T2).

FIG. 1 is a block diagram provided to explain configurations of a transmitting system according to an exemplary embodiment.

According to FIG. 1, the transmitting system 1000 may include an input processing block 1100, a bit interleaved coding and modulation (BICM) block 1200, a structure block 1300 and an orthogonal frequency division multiplex (OFDM) waveform generator block 1400.

The input processing block 1100 generates a baseband frame (BBFRAME) from an input stream of data to be serviced. Herein, the input stream may be a transport stream (TS), Internet packet (IP) stream, a generic stream (GS), a generic stream encapsulation (GSE), etc.

The BICM block 1200 determines a forward error correction (FEC) coding rate and a constellation order depending on a region where the data to be serviced will be transmitted (e.g., a fixed PHY frame or mobile PHY frame), and then, performs encoding. Signaling information on the data to be serviced may be encoded through a separate BICM encoder (not illustrated) or encoded by sharing the BICM encoder 1200 with the data to be serviced, depending on a system implementation.

The structure block 1300 combines time interleaved data with signaling information to generate a transmission frame.

The OFDM waveform generator block 1400 generates an OFDM signal in the time domain on the generated transmission frame, modulates the generated OFDM signal to a radio frequency (RF) signal and transmits the modulated RF signal to a receiver.

The signaling information which is combined with the time interleaved data in the structure block 1300 may include information on an input type of the input stream input into the input processing block 1100 and other various information.

Figure 2:
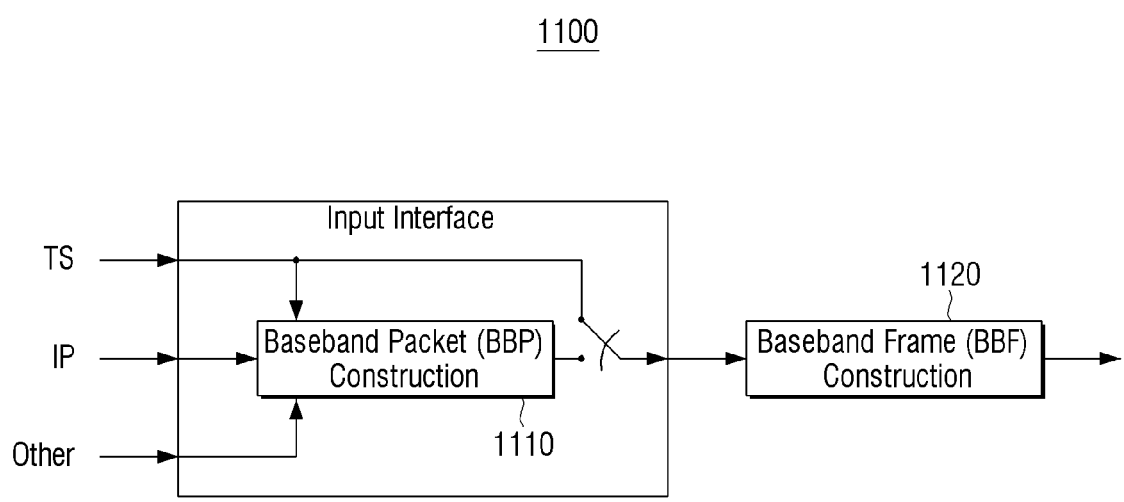
FIG. 2 is a diagram illustrating an input processing block illustrated in FIG. 1, according to an exemplary embodiment.

FIG. 2 is a diagram illustrating an exemplary embodiment of the input processing block illustrated in FIG. 1.

As illustrated in FIG. 2, the input processing block 1100 includes a baseband packet (BBP) construction block 1110 and a baseband frame (BBF) construction block 1120. Herein, a TS stream may be output as it is, without being transformed into a BBP format. Accordingly, a TS packet constituting the TS stream may correspond to a BBP. The BBF construction block 1120 generates a BBF from input BBPs.

FIGS. 3A to 3D are diagrams provided to explain a unit structure of a transmission frame according to an exemplary embodiment.

Figure 3A:
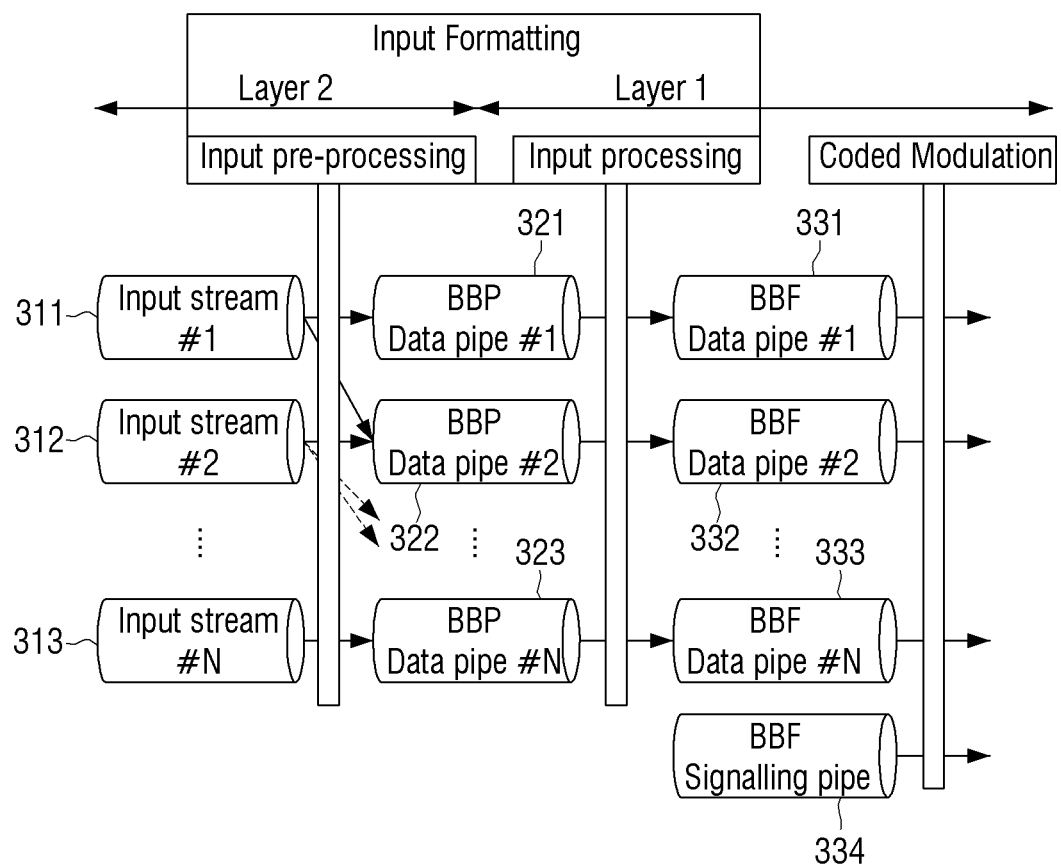
FIGS. 3A to 3D are diagrams provided to explain a unit structure of a transmission frame according to an exemplary embodiment.

As illustrated in FIG. 3A, an input processing module where an input stream is processed to a BBF may operate in a data pipe level.

FIG. 3A illustrates a process of processing an input stream to a BBF. A plurality of input streams 311 to 313 are processed to data pipes 321 to 323 for a plurality of BBPs through an input pre-processing process. The data pipes 321 to 323 for the plurality of BBPs are encapsulated to data pipe 331 to 333 for a plurality of BBFs through an input processing process (FIG. 1, input processing block 1100), and then, scheduled for a transmission frame.

Figure 3B:
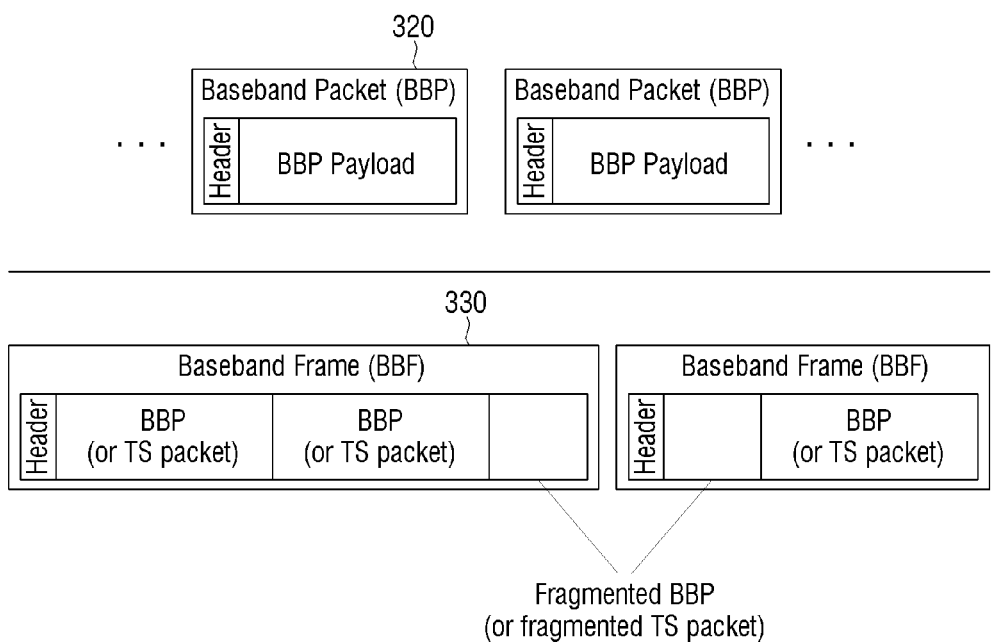

FIG. 3B is a diagram provided to explain a relationship between BBPs 320 and BBFs 330. Herein, a BBP payload of a BBP 320 is a packet constituting a TS stream, an IP stream or a stream in other formats. Further, a BBF 330 may include a plurality of full BBPs or a fragmented BBP.

Figure 3C:
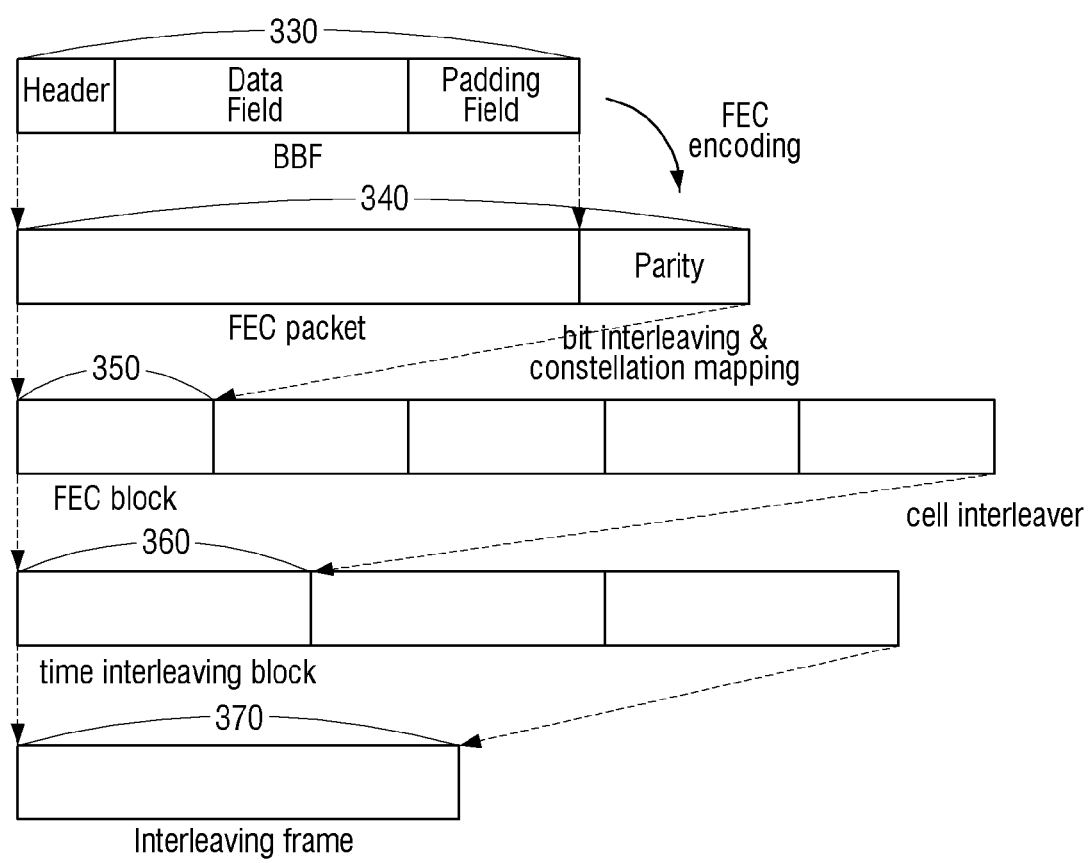

FIG. 3C is a diagram provided to explain a local frame structure for each PLP.

As illustrated in FIG. 3C, the BBF 330 includes a header, a data field and a padding field.

A parity is added to the BBF 330 through an FEC encoding process, and consequently the BBF 330 is processed to a BBF FEC packet 340.

The BBF FEC packet 340 is processed to an FEC block 350 through a bit interleaving and constellation mapping process, a plurality of FEC blocks are processed to a time interleaving block 360 through a cell interleaving process, and a plurality of interleaving blocks constitute an interleaving frame 370.

Figure 3D:
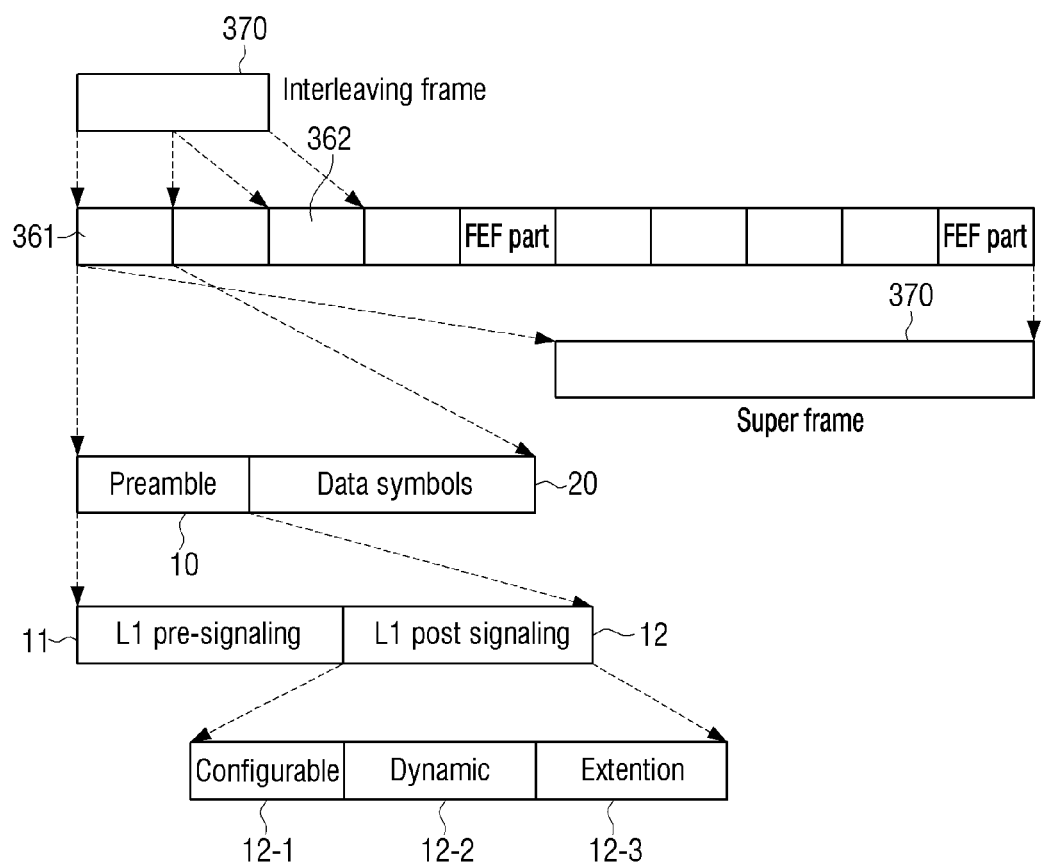

FIG. 3D is a frame provided to explain a structure of an interleaving frame.

Referring to FIG. 3D, the interleaving frame 370 may be transmitted through transmission frames 361, 362 that are different from each other, and a plurality numbers of transmission frames and further extension frame (FEF) parts may form one superframe 370.

Meanwhile, one transmission frame 361 may be formed of a preamble symbol 10 and data symbols 20 which transmit data.

The preamble symbol 10 includes a layer 1 (L1) pre signaling region 11 and an L1 post signaling region 12. The L1 pre signaling region 11 provides basic transmission parameters including parameters needed to receive and decode an L1 post signaling and may have a fixed length.

The L1 post signaling region 12 includes a configurable field 12-1 and a dynamic field 12-2.

The configurable field 12-1 includes information that can change by superframe unit, while the dynamic field 12-2 includes information that may change by frame. Herein, a relationship between a super frame and a frame will be explained with reference to drawing that will be described below. Here, the frame refers to a transmission frame.

The L1 post signaling region 12 may selectively include an extension field 12-3. Further, the L1 post signaling region 12 may further include a cyclic redundancy check (CRC) field and a L1 padding field as needed (not illustrated).

Figure 4:
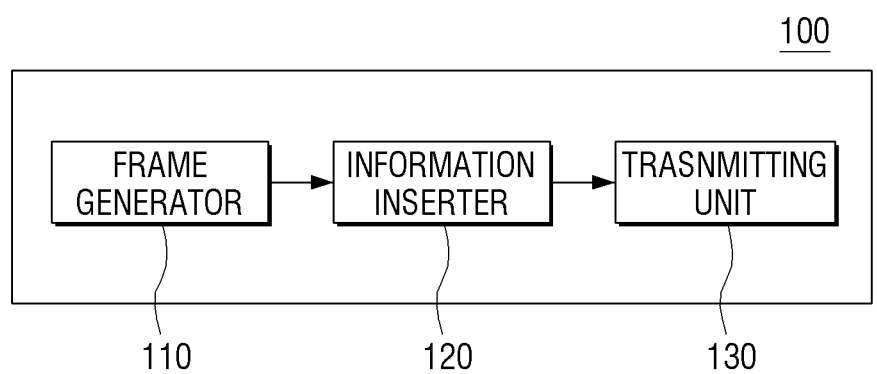
FIG. 4 is a block diagram indicating a configuration of a transmitting apparatus according to an exemplary embodiment.

FIG. 4 is a block diagram indicating a configuration of a transmitting apparatus according to an exemplary embodiment.

According to FIG. 4, the transmitting apparatus 100 includes a frame generator 110, an information inserter 120 and a transmitter 130. Here, the information inserter 120 may correspond to the structure block 1300 illustrated in FIG. 1, and transmitter 130 may correspond to the OFDM waveform generator block 1400.

The frame generator 110 maps data contained in an input stream to at least one signal processing path through the above described BBP and BBF processing to generate a frame. For example, this transmitting apparatus applies a physical layer pipe (PLP) concept which enables to provide various broadcasting services with different modulation schemes, channel coding rates, time and cell interleaving lengths, etc. to one broadcast channel.

A PLP indicates a signal path which is independently processed. That is, each service (e.g., video, expanded video, audio, data stream, etc.) may be transmitted and received through a plurality of RF channels wherein a PLP is a path that those services are transmitted or a stream including data which is transmitted through the path. Further, a PLP may be positioned on slots which are distributed at time intervals along a plurality of RF channels or may be distributed at time intervals along one RF channel. That is, one PLP may be distributed and be transmitted with time intervals on one RF channel or a plurality of RF channels.

A PLP has an input mode A which provides one PLP and an input mode B which provides a plurality of PLPs. In particular, in case of supporting the input mode B, the PLP can not only provide a robust specific service but also have a benefit to improve decoding FEC codes by transmitting one stream in a distributed manner, thereby increasing a time interleaving length, as continuous errors occurred in channels are not concentrated on a part of a stream but distributed. Further, in case of receiving only a specific stream, the PLP allows a receiver to be used at a low power by turning off a receiver while not receiving the specific stream, and thus it may be suitable for providing a wireless or mobile broadcasting service.

Transmission efficiency can be improved by incorporating information that can be commonly transmitted through plural PLPs into one PLP and then transmitting the information, which can be performed by a PLP0, referred to as a common PLP. PLPs other than the PLP0 can be used for data transmission, and are referred to as data PLPs.

In other words, the frame generator 110 maps data contained in an input stream to at least one signal processing path to generate a frame and performs signal processing for each path. For instance, signal processing may include at least one process of input stream synchronization, delay compensation, null packet deletion, CRC coding, header insertion, coding, interleaving and modulation. A frame which is signal-processed for each of paths, together with signaling information, is generated as a transmission frame, and the generated transmission frame is transmitted to a receiver (not illustrated).

The information inserter 120 inserts signaling information in a signaling region of a frame.

Herein, the signalling information may be L1 signaling information that is transmitted through the preamble symbol 10 for frame synchronization, and the preamble symbol 10 where the L1 signaling information is inserted may include an L1 pre signaling region 11 and an L1 post signaling region 12, as illustrated in FIG. 3D. Further, the L1 post signaling region 12 includes the configurable field 12-1 and the dynamic field 12-2.

The L1 pre signaling region 11 may include information for interpreting the L1 post signaling and information about the transmitting apparatus 100, and the L1 pre signaling region 11 may be implemented to have the same length all the time.

The L1 post signaling region 12 may include information on each PLP and the transmitting apparatus 100, and the L1 signaling region which is included in each frame within one super-frame (FIG. 3d, 370) may have the same length but may include different contents.

The signaling information may include information on an input type of an input stream and a data type of which data is mapped to at least one signal processing path.

Here, the information on the input type may indicate whether all signal processing paths in a frame are the same input type.

Specifically, the input type may be at least one of a first input type in which all of the signal processing paths transmit only a first type stream in a standalone mode, a second input type in which all of the signal processing paths transmit the first type stream and a second type stream which is different from the first type stream in a mixed mode, a third input type in which all of the signal processing paths transmit the second type stream in the mixed mode, and a fourth input type in which at least two processing paths transmit streams which are different from each other.

Herein, the first type stream may be a TS stream, and the second type stream may be a packet stream such as an IP stream.

The signaling information, in case that at least one signal processing path includes a TS stream, may further include at least one of information on whether to use a mode adaptation and information on an input stream synchronizer (ISSY) mode.

The input type information on an input stream may be included in the L1 pre signaling region 11, and information on a data type of which data is mapped to each signaling processing path, that is, respectively transmitted through each of the signal processing paths, may be included in the L1 post signaling region 12. Specifically, the data type information may be included in the configurable field 12-1.

The L1 signaling information may be inserted in a symbol different from a preamble symbol for frame synchronization and transmitted, depending on implementation of the transmitting apparatus 100.

The transmitter 130 transmits a frame where the signaling information is inserted. The transmitting apparatus 100 may transmit, to a receiver (not illustrated), the frame together with the signaling information in the above described format, which includes the information on an input stream. Here, the transmitter 130 may be implemented as the OFDM waveform generator block 1400.

The transmitter 130 may transmit data through each cell. Some OFDM symbols may perform various functions such as transmission of an L1 signaling field, signal detection, frame opening and closing, etc., which is irrelevant to the present inventive concept and thus detailed explanation thereof is omitted.

Figure 5:
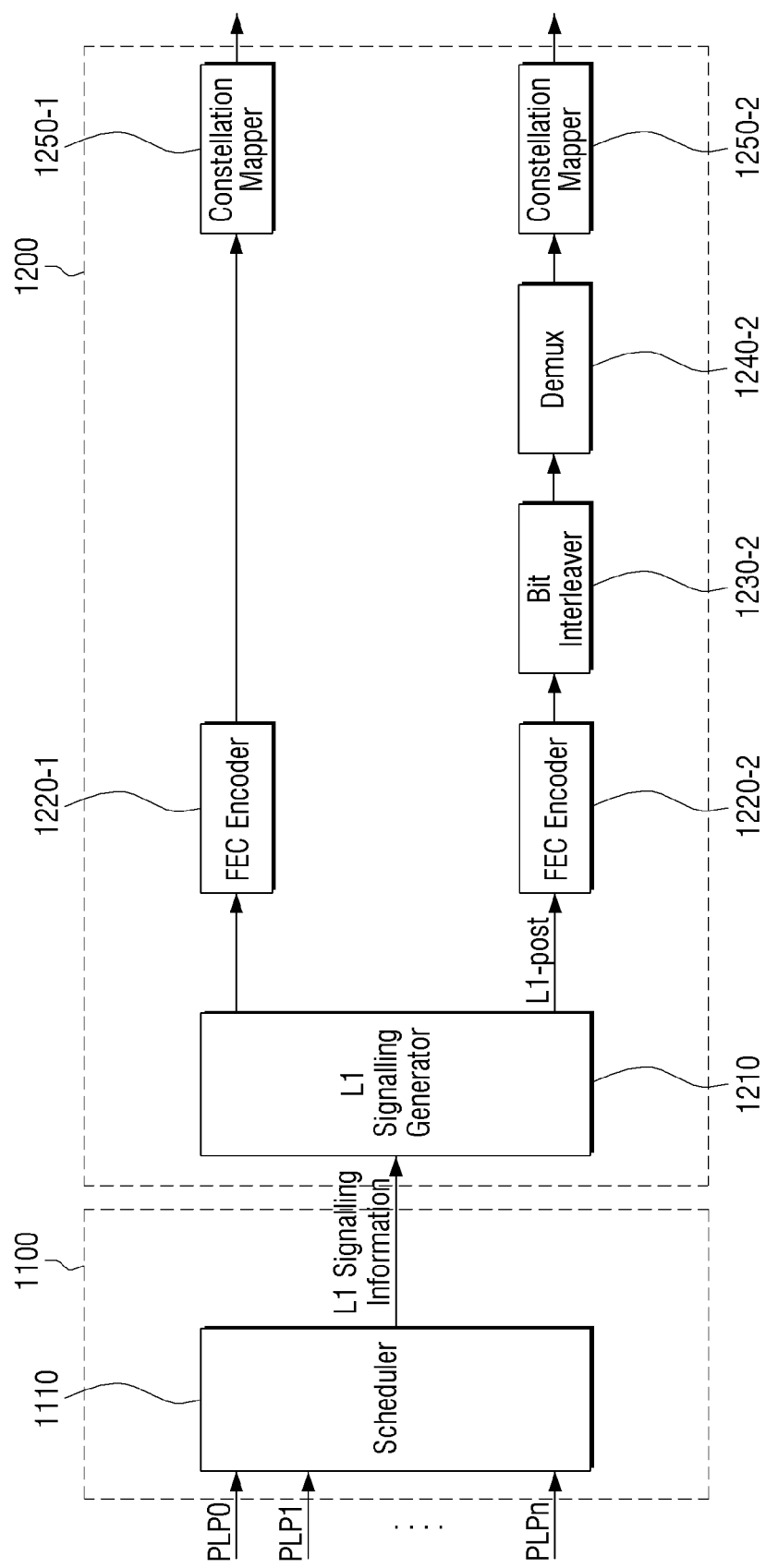
FIG. 5 is a block diagram provided to explain a configuration of signaling information according to an exemplary embodiment.

FIG. 5 is a block diagram provided to explain a configuration of signaling information according to an exemplary embodiment.

FIG. 5 illustrates an input processing block 1100 and a BICM block 1200 respectively corresponding to the same blocks in FIG. 1. The input processing block 1100 includes a scheduler 1110. The BICM block 1200 includes an L1 signaling generator 1210, an FEC encoder 1220-1 and 1220-2, a bit interleaver 1230-2, a demux 1240-2, constellation mappers 1250-1 and 1250-2. The L1 signaling generator 1210 may be included in the input processing block 1100, according to an exemplary embodiment.

An n number of service data are mapped to a PLP0 to a PLPn respectively. The scheduler 1110 determines a position, modulation and coding rate for each PLP in order to map a plurality of PLPs to a physical layer of T2. In other words, the scheduler 1110 generates L1 signaling information. The scheduler 1110 may output dynamic field information among L1 post signaling information of a current frame, using the structure block 1300 which may be referred to as a frame builder. Further, the scheduler 1110 may transmit the L1 signaling information to the BICM encoder 1200. The L1 signaling information includes L1 pre signaling information and L1 post signaling information.

The L1 signaling generator 1210 may differentiate the L1 pre signaling information from the L1 post signaling information to output them. The FEC encoders 1220-1 and 1220-2 perform respective encoding operations which include shortening and puncturing for the L1 pre signaling information and the L1 post signaling information. The bit interleaver 1230-2 performs interleaving by bit for the encoded L1 post signaling information. The demux 1240-2 controls robustness of bits by modifying an order of bits constituting cells and outputs the cells which include bits. Two constellation mappers 1250-1 and 1250-2 map the L1 pre signaling information and the L1 post signaling information to constellations, respectively. The L1 pre signaling information and the L1 post signaling information processed through the above described processes are output to be included in each frame by the structure block 1230.

The L1 pre signaling information may include input type information on an input stream. Here, the input type information on an input stream may be information to indicate whether all of the signal processing paths in the frame are the same input type.

The input type information may be included in a two-bit field, and include whether all signal processing paths (PLPs) are the same input type in a current superframe, as shown in Table 1 below.

TABLE 1

| Value | Input Type |
|---|---|
| 00 | Every PLP in the current superframe carries one and only one TS stream with a BBP format in the standalone mode. |
| 01 | Every PLP in the current superframe carries at least a TS stream with BBP format in the mixed mode. |
| 10 | Every PLP in the current superframe carries any input stream supported by the TYPE field in the generic BBP format, except TYPE = "100" for TS stream in a mixed mode (i.e. the PLP does not carry any TS stream). |
| 11 | For all other scenarios, where at least two PLPs in the current superframe have two different payload types (the payload type is then signaled in L1-POST). |

As such, aside from describing the input type for each of PLP, signaling the input type from the whole transmitting system perspective is helpful in effectively operating and implementing a receiver. Here, when all PLPs have the same data type, i.e., payload_type (INPUT_TYPE=00 or 01 or 11), a separate signaling does not have to be performed for payload_type for each of PLP in the L1 post signaling region.

The configurable field 12-1 (FIG. 3D) among the L1 post signaling information may include at least one of information on a data type mapped to at least one signal processing path, information on whether to use mode adaptation when at least one signal processing path includes a TS stream, and information on an ISSY mode.

The dynamic field 12-2 (FIG. 3D) among the L1 post signalling information may include information on a buffer size of a receiver required according to a mode information, and information on a time between output of an P1 symbol of a predetermined frame transmitting user packets and output of a predetermined bit of a first user packet among the user packets. Here, the predetermined frame is a first frame to which an interleaving frame transmitting user packets, and the predetermined bit may be a most significant bit (MSB). Further, according to circumstances, the dynamic field may further include an input stream clock reference (ISCR) information.

Hereinafter, the L1 post signaling information will be explained in detail with reference to drawings.

FIGS. 6A to 6F are diagrams illustrating an L1 post signaling region according to various exemplary embodiments.

FIG. 6A is a diagram illustrating a configurable field of an L1 post signaling region.

As illustrated in FIG. 6A, the configurable field of the L1 post signaling region may include information 611 on a data type mapped to a signal processing path, information 612 on whether to use mode adaptation and information 613 on an ISSY mode 613. NUM_PLP indicate the number of PLPs.

The information 611 on a data type mapped to at least one signal processing path may be implemented as two-bit field, but not limited thereto.

The information 611 on a data type mapped to at least one signal processing path may show a data type that is transmitted within a PLP as illustrated in Table 2, i.e., a payload_type.

TABLE 2

| Value | Input Type |
| --- | --- |
| 00 | The PLP carries one single TS stream in stand-alone mode (i.e. the PLP does not carry any other stream of any type) |
| 01 | The PLP carries one or more streams of any of the input types supported by the TYPE field of the generic baseband packet format, including at least a TS stream in mixed mode. |
| 10 | The PLP carries one or more streams of any of the input types supported by the TYPE field of the generic baseband packet format, but excluding any TS stream in mixed mode (TYPE = "100"). |
| 11 | reserved |

Figure 7A:
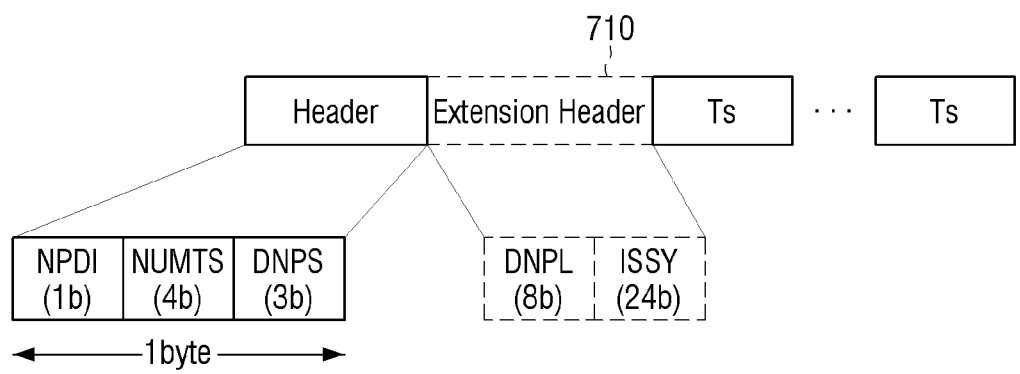
FIGS. 7A to 7B are diagrams illustrating a baseband packet (BBP) format according to exemplary embodiments.

For example, when PLP_PAYLOAD_TYPE, which is an L1 post signaling parameter on the corresponding PLP, is set to be "00," a BBP format in a standalone mode as illustrated in FIG. 7A may apply.

FIG. 7A is a diagram illustrating a BBP format 710 in case where the corresponding PLP input stream is a TS stream.

Figure 7B:
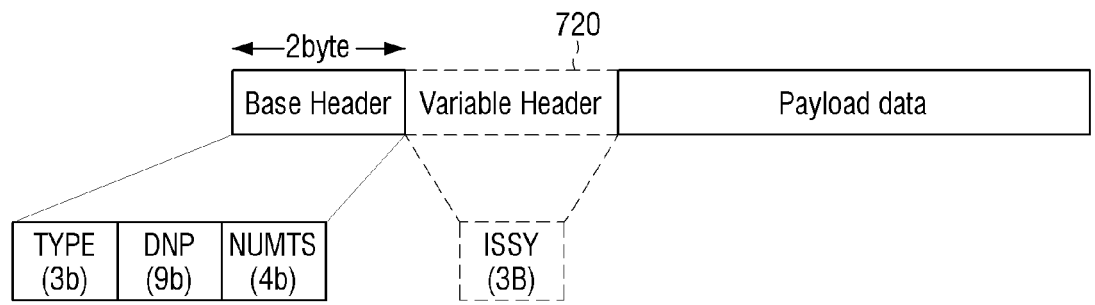

By comparison, when PLP_PAYLOAD_TYPE, which is the L1 post signaling parameter on the corresponding PLP, is set to be "01," a BBP format 710 in a mixed mode as illustrated in FIG. 7B may apply.

FIG. 7B is a diagram illustrating a BBP format 720 which includes a TS packet constituting a TS stream, when an input stream of the corresponding PLP includes the TS stream and an IP or other kinds of stream other than the TS stream.

As illustrated in FIGS. 7A and 7B, an ISSY field is included in a variable header 710 and 720 (or extension header), and, to the ISSY field, an input stream clock reference (ISCR) value may be transmitted which indicates a counter value (recorded) at a moment when a first TS packet included in a BBP is input to a BBP construction block, i.e., the scheduler 1110 in FIG. 5. Herein, the counter operates on a cycle which is commonly known to a transmitting apparatus and a receiving apparatus. The ISSY field may be included in only the first BBP which starts in a BBF among one or more BBPs which constitutes the BBF.

The information 612 on whether to use mode adaptation may be implemented as one-bit field, but not limited thereto.

The information 612 on whether to use mode adaptation may include information on whether to use mode adaptation when a signal processing path includes a TS stream. When mode adaptation is used, a corresponding field is set to be '1,' and otherwise, the corresponding field is set to be '0.' Further, when a corresponding PLP does not carry a TS stream, the corresponding bit may be left as in a reserved area.

The ISSY mode information 613 may be implemented as one-bit field, but not limited thereto.

The ISSY mode information 613 may show whether variables of an input synchronization mechanism are provided, when a corresponding PLP transmits a TS stream. If a corresponding field is set to '1', time to output (TTO) and buffer size (BUFS) values to be described later are provided in a PLP loop in a dynamic field of L1 post signaling, and an ISCR value is provided from an L2 packet transmitting a T2 packet, that is, an ISSY field of a BBP. If the corresponding field is set to '0', the ISSY field is not activated. That means, in case that the corresponding PLP does not transmit a TS stream or the mode adaptation is not used, the corresponding field can be set to '0.'

According to an exemplary embodiment, when a corresponding PLP transmits a TS stream, an L1 pre signaling parameter INPUT_TYPE is set to be '11;' an L1 post signaling parameter PLP_PAYLOAD_TYPE may be set to be '00' or '01.' Otherwise, an L1 pre signaling parameter INPUT_TYPE may be set to be '00' or '01.'

According to another exemplary embodiment, when the corresponding PLP does not transmit a TS stream, the L1 pre signaling parameter INPUT_TYPE is set to be '11;' and the L1 post signaling parameter PLP_PAYLOAD_TYPE on the corresponding PLP may be set to be '10' or '11.' Otherwise, the L1 pre signaling parameter INPUT_TYPE may be set to be '10'.

According to another exemplary embodiment, an L1 signaling may further include different kinds of indicators for each of PPLs and may have different expression methods by encoding the indicators.

Figure 6B:
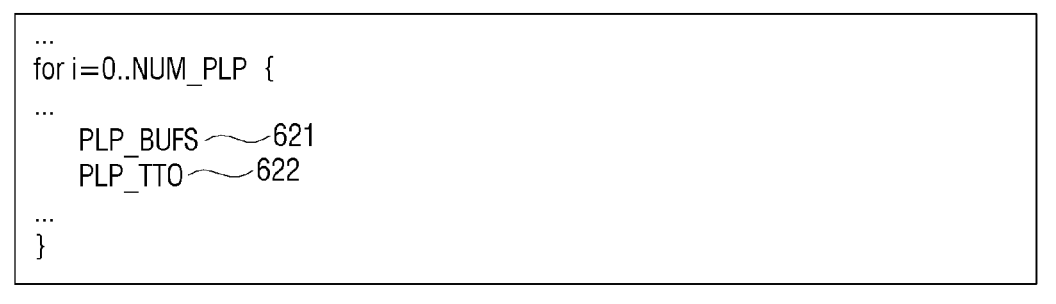

FIG. 6B is a diagram illustrating a dynamic field of an L1 post signaling region according to an exemplary embodiment.

A dynamic field among L1 post signaling information may include the BUFS 621 which is information on a buffer size of a receiver required according to ISSY mode information, and the TTO 622 which is time information on a first BBP that starts at a data service area of a first BBF of an interleaving frame including a current transmission frame.

Information on a receiver buffer size may be implemented as a 32-bit field, but not limited thereto. For example, when ISSY is not used in a corresponding PLP, i.e., the L1 post signaling parameter PLP_ISSY is set to be '0,' a corresponding field may be set to be '0.'

The information 622 on the first BBP which starts in s data sub-area of the first BBF of an interleaving frame which include a current transmission frame may be implanted as a 10-bit field, but not limited thereto. For example, when ISSY is not used in a corresponding PLP, i.e., an L1 post signaling parameter PLP_ISSY is set to be '0,' a corresponding field mat be set to be '0.'

The dynamic field may further include ISCR information, according to an exemplary embodiment (not illustrated in drawings).

FIG. 6C is a diagram illustrating a configurable field and a dynamic field of an L1 post signaling region according to another exemplary embodiment.

Generally, when the number of PLPs is given, s whole signaling table may be designed to have a fixed length. However, there may exist a case where a specific field does not have any meaning conditionally. In this case, when a value in a specific field is not used, a parity bit or user data may be additionally transmitted without transmitting the field.

Therefore, the table illustrated in FIG. 6A may be modified to the table illustrated in FIG. 6C. Similarly, the table illustrated in FIG. 6A may be modified to the table illustrated in FIG. 6D.

In this case, a definition of each field may be modified, but a scope of the change is limited to a change in an expression method, not an operation of a transmitting system. Further, it is obvious that detailed conditions of a conditional sentence may be modified to an extent that an operation of the transmitting system is not modified.

Further, the number of bits required to deliver the TTO information 622 and BUFS information 621 may change according to the transmitting system property, and, under a specific condition, optimization from a perspective of bit number may be performed through encoding. For example, when a maximum size of the BUFS is 2 MB, 21 bits are required when the unit is indicated in a form of bit. However, if a minimum unit of a memory is limited to 2 KB, an amount required to indicate the BUFS may be only 10 bit. Also, in case of the TTO, since data that needs to be delivered essentially is time, it is obvious that all kinds of encoding methods that are pre-defined between the transmitting system and a receiver can be used.

FIG. 6E is a diagram illustrating an L1 post signaling region according to still another exemplary embodiment.

As illustrated in FIG. 6E, the L1 post signaling region may include the above-described information, without differentiating the configurable field and the dynamic field. The information included in these fields has been described above, and thus detailed explanations thereon are omitted.

FIG. 6F is a diagram illustrating an L1 post signaling region according to still another exemplary embodiment.

Generally, when the number of PLPs is given, a whole signaling table may be designed to have a fixed length. However, there may exist a case where a specific field does not have any meaning conditionally. In this case, when a value in a specific field is not used, a parity bit or user data, without transmitting the field, may be additionally transmitted Therefore, the table illustrated in FIG. 6E may be modified as illustrated in FIG. 6F.

Figure 8A:
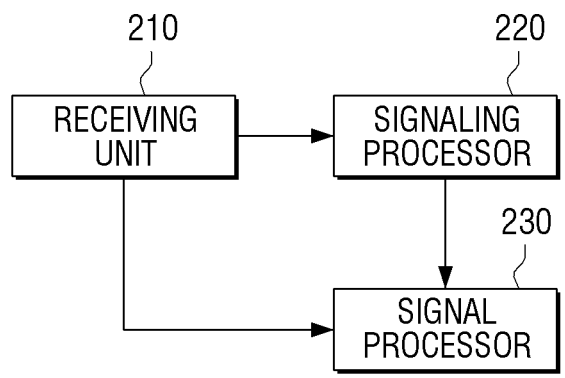
FIG. 8A is a block diagram illustrating a configuration of a receiving apparatus according to an exemplary embodiment.

FIG. 8A is a block diagram illustrating a configuration of a receiving apparatus according to an exemplary embodiment.

Referring to FIG. 8A, the receiving apparatus 200 includes a receiver 210, a signaling processor 220, and a signal processer 230.

The receiver 210 receives data from a transmitter which maps data contained in an input stream to at least one signal processing path.

Specifically, the receiver 210 may receive a stream which includes signaling information and data mapped to at least one signal processing path. The signaling information may include comprehensive information on an input type of each stream input into the transmitter, and information on a data type which are respectively mapped to at least one signal processing path.

The information on the input type of the input stream may show whether all of the signal processing paths in a frame are the same input type.

Specifically, the information on an input type may include information on at least one of a first input type in which all of the signal processing paths transmit only a first type stream in a standalone mode, a second input type in which all of the signal processing paths transmit the first type stream and a second type stream which is different from the first type stream in a mixed mode, a third input type in which all of the signal processing paths transmit the second type stream in the mixed mode, and a fourth input type in which at least two processing paths transmit streams which are different from each other.

Herein, the first type stream may be a TS stream, and a second type stream may be a common packet stream including an IP stream.

The signaling information may further include at least one of information on whether to use mode adaptation and information on an ISSY mode, when at least one signal processing includes a TS stream.

A signaling region includes an L1 pre signaling region and an L1 post signaling region. Comprehensive information on an input type of each stream input into a transmitting apparatus is included in the L1 pre signaling region, and information on each data type which is transmitted through a corresponding signal processing path is included in the L1 post signaling region.

The L1 post signaling region includes a configurable field and a dynamic field, and information on a data type which is transmitted to each signal processing path, i.e., payload type, may be included in configurable field.

The signaling processor 220 extracts signaling information from a received frame. In particular, the signaling processor 220 extracts and decodes L1 signaling, thus can achieve various information on a corresponding PLP included in the L1 pre signaling region and the L1 post signaling region.

After performing synchronization, the signal processor 230 may detect data from data symbols. For instance, the signal processor 230 may perform demodulation, frame de-building, BICM decoding, and input de-processing.

Figure 8B:
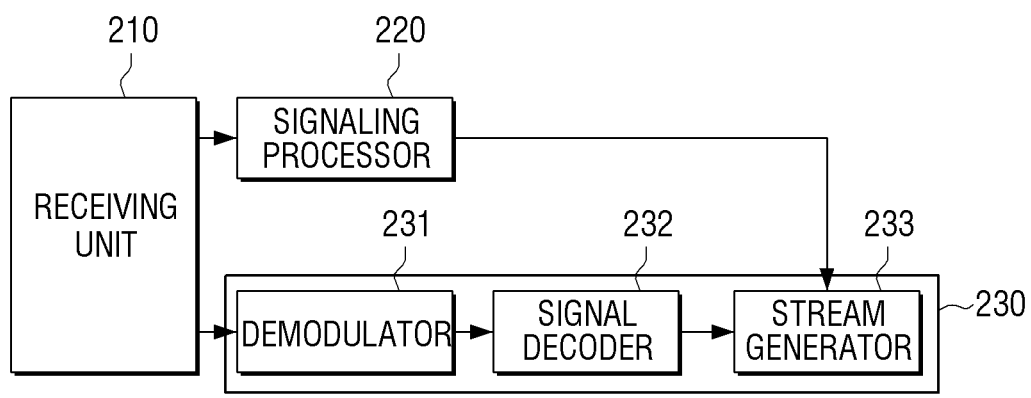
FIG. 8B is a block diagram provided to specifically explain a signal processor according to an exemplary embodiment.

FIG. 8B is a block diagram provided to specifically explain a signal processor according to an exemplary embodiment.

According to FIG. 8B, the signal processor 230 includes a demodulator 231, a signal decoder 232 and a stream generator 233.

The demodulator 231 performs demodulation from received RF signals according to an OFDM parameter, performs sync detection, and when a sync is detected, recognizes if a current frame is a frame including service data which is intended to be received, from signaling information stored in a sync region. For example, it can recognize whether a mobile frame is received and whether a fixed frame is received or not.

In case where an OFDM parameter for a signaling region and data region is not predetermined, an OFDM parameter for the signaling region and data region, which is stored in the sync region, is obtained, and then the OFDM parameter for the signaling region and data region that comes right after the sync region is obtained to perform demodulation.

The signal decoder 232 performs decoding on the demodulated data. In this case, the signal decoder 232 may use the signaling information to obtain parameters stored in each data region with respect to an FEC scheme, a modulation method, etc. and then may perform the decoding. Further, the signal decoder 232 may calculate a position of data based on data information included in the configurable field and the dynamic field. That is, the signal decoder 223 may determine where a particular PLP is transmitted.

The stream generator 233 may process a BBF input from the signal decoder 232 to generate data to be serviced.

For example, the stream generator 233 may generate an L2 packet from an error corrected L1 packet based on the ISSY mode, BUFS, a TTO value and an ISCR value provided from the signaling processor 220.

The stream generator 233 may include de-jitter buffers, which may in turn regenerate a precise timing for reconstructing an output stream based on the L1 signaling provided from the signaling processor 220. Therefore, delay for synchronizing between a plurality of PLPs may be compensated.

Figure 9:
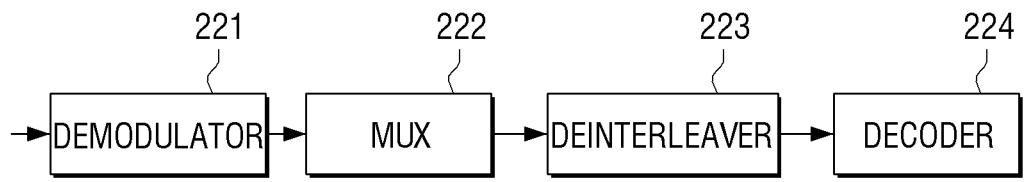
FIG. 9 is a block diagram illustrating a configuration of a signal processor according to an exemplary embodiment.

FIG. 9 is a block diagram of illustrating configurations of a signaling processor according to an exemplary embodiment.

According to FIG. 9, a signaling processor 220 includes a demodulator 221, a mux 222, a deinterleaver 223 and a decoder 224.

The demodulator 231 receives and demodulates a signal transmitted from the transmitting apparatus 100 (FIG. 4). The demodulator 221 demodulates the received signal to generate a value corresponding to a low density parity check (LDPC) codeword, and then outputs the generated value through a mux 222.

In this case, the value corresponding to the LDPC code word may be indicated as a channel value of the received signal. There may exist various ways of determining the channel value. For example, a method of determining the channel value may be a method of determining a log likelihood ratio (LLR) value.

The LLR value may be expressed as a value obtained by taking a logarithm of a rate of a probability where a bit transmitted from the transmitting apparatus 100 should be zero (0) to a probability where the bit transmitted from the transmitting apparatus 100 should be one (1). Alternately, the LLR value may be a bit value itself determined by a hard decision, or a representative value determined depending on a section where the probability of the bit transmitted from the transmitter 100 being zero (0) or one (1) is included.

The mux 222 multiplexes an output value of the demodulator 221 and outputs a multiplexed value to a deinterleaver 223. The output value of the demodulator 221 is a value corresponding to an LDPC codeword, and may be, for example, an LLR value.

The mux 222, which is a component corresponding to the demux 1240-2 (FIG. 5) of the transmitting system 1000 (FIG. 1), may perform an operation corresponding to a demultiplexing operation performed in the demux 1240-2. That is, the mux 222 performs a parallel-to-serial conversion on a value corresponding to the LDPC codeword output from the demodulator 221 and performs multiplexing of the value corresponding to the LDPC codeword.

The deinterleaver 223 deinterleaves an output value of the mux 222 and outputs a deinterleaved value to the decoder 224.

The deinterleaver 223, which is a component corresponding to the interleaver 1230-2 (FIG. 5) of the transmitting system 1000, may perform an operation corresponding to the interleaving operation performed in the interleaver 1230-2. That is, the deinterleaver 223 may perform deinterleaving of a value corresponding to the LDPC codeword such that the deinterleaving corresponds to the interleaving operation performed in the interleaver 1230-2. Here, the value corresponding to the LDPC codeword may be, for example, an LLR value.

The decoder 224 which is a component corresponding to the FEC encoder 1220-2 of the transmitting system 1000, may perform an operation corresponding to an operation performed by the FEC encoder 1220-2. The decoder 224 may perform a decoding based on an deinterleaved LLR value and may output signaling information, i.e., a L1 signaling.

Figure 10:
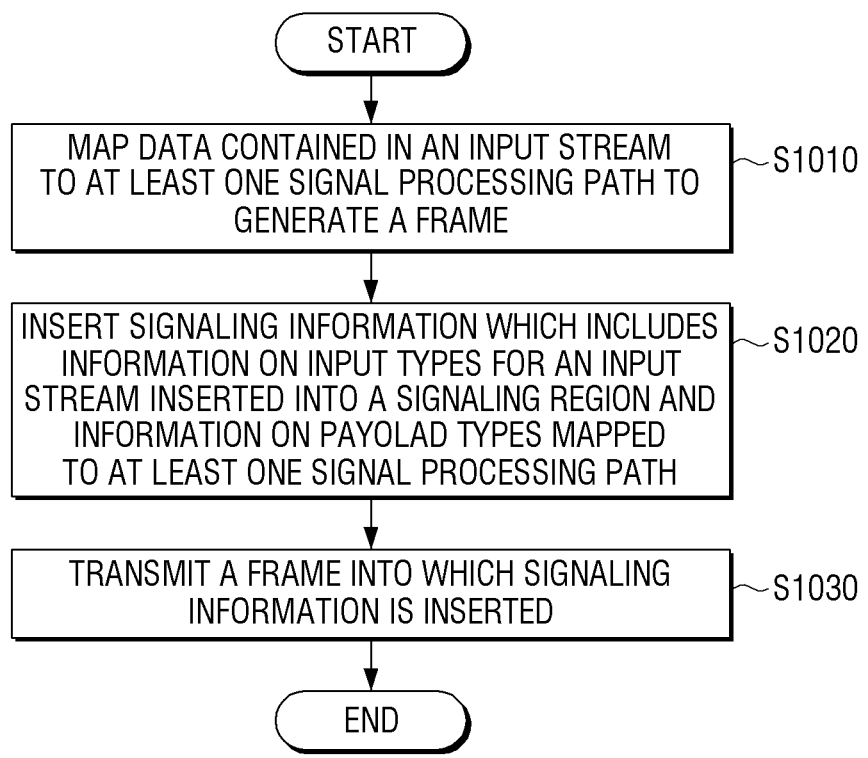
FIG. 10 is a flowchart explaining a signaling processing method of a transmitting apparatus according to an exemplary embodiment.

FIG. 10 is a flowchart provided to explain a signal processing method of a transmitting apparatus according to an exemplary embodiment.

According to the signal processing method of a transmitting apparatus illustrated in FIG. 10, data contained in an input stream is mapped to at least one signal processing path to generate a frame (S1010). Specifically, a transmission frame may be generated through a BBP process and a BBF process on an input stream and various signal processing process.

Then, signaling information is inserted into a signaling region of the frame (S1020). Herein, the signaling information may include information on an input type of an input stream and information on a data type which is mapped to at least one signal processing path.

Then, a frame into which the signaling information is inserted is transmitted (S1030).

The information on the input type of the input stream included in the signaling information may show whether all of the signal processing paths in the frame are the same input type.

Specifically, the information on an input type may include information on at least one of a first input type in which all of the signal processing paths transmit only a first type stream in a standalone mode, a second input type in which all of the signal processing paths transmit the first type stream and a second type stream which is different from the first type stream in a mixed mode, a third input type in which all of the signal processing paths transmit the second type stream in the mixed mode, and a fourth input type in which at least two processing paths transmit streams which are different from each other.

Herein, the first type stream may be a TS stream, and a second type stream may be a common packet stream including an IP stream.

The signaling information may further include at least one of information on whether to use mode adaptation and information on an ISSY mode, when at least one signal processing includes a TS stream.

A signaling region includes an L1 pre signaling region and an L1 post signaling region. Comprehensive information on an input type of each input stream is included in the L1 pre signaling region while information on a data type transmitted to each signaling process is included in the L2 post signaling region.

The L1 post signaling region includes a configurable field and a dynamic field. Information on a payload type may be included in the configurable field.

Figure 11:
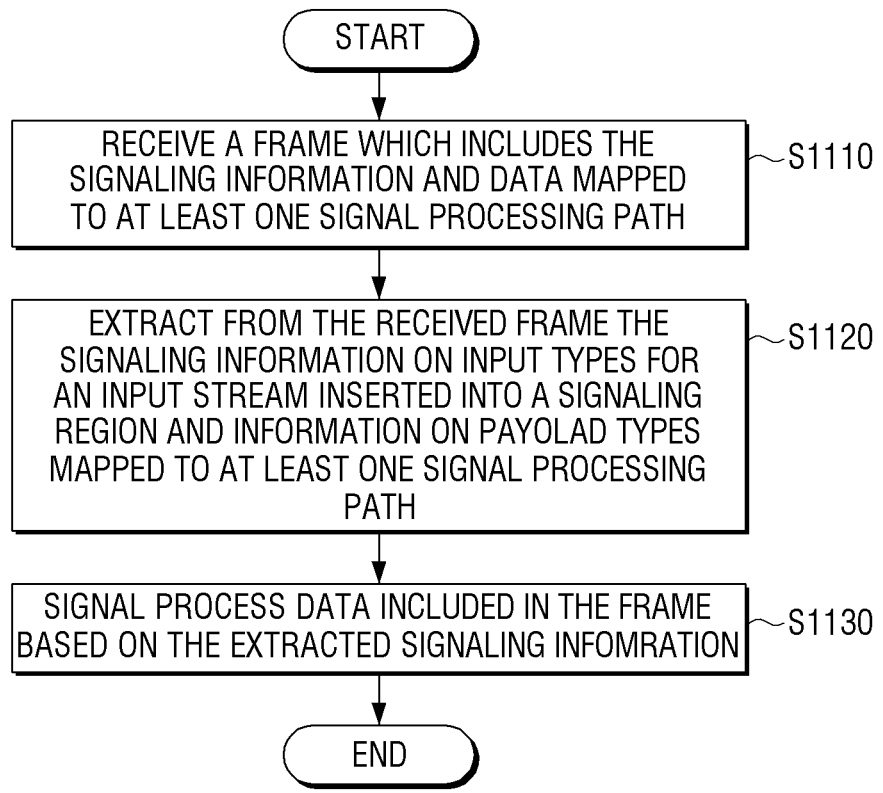
FIG. 11 is a flowchart explaining a signaling processing method of a receiving apparatus according to an exemplary embodiment.

FIG. 11 is a flowchart provided to explain a signal processing method of a receiving apparatus according to an exemplary embodiment.

According to the signal processing method of FIG. 11, the receiving apparatus, which receives data from a transmitter which maps data contained in an input stream to at least one signal processing path and then transmits the data, receives signaling information and a frame which includes a data mapped to at least one signal processing path (S1110).

Then, the signaling information is extracted from a received frame (S1120).

Then, data included in the frame is signal processed based on the extracted signaling information (S1130).

Herein, the signaling information may include information on an input type of an input stream and on a data type of which is mapped to at least one signal processing path.

The information on an input type of an input stream may show whether all of the signal processing paths in the frame are the same input type. In this case, the receiving apparatus may use information to optimize an operation of the receiver. For example, there may exist a specific operation block in the receiving apparatus which is used to process only an input stream of a specific type. In this case, the receiving apparatus uses the above described information to learn whether an input stream of a specific type is transmitted to a corresponding superframe of a current receiving bandwidth. Therefore, the receiving apparatus can determine whether the specific operation block is used even before obtaining information on all of the signaling processing paths, which advances an initialization process of the specific operation block, which in turn reduces a channel zapping time.

Specifically, the input type information may include information on at least one of a first input type in which all of the signal processing paths transmit only a first type stream in a standalone mode, a second input type in which all of the signal processing paths transmit the first type stream and a second type stream which is different from the first type stream in a mixed mode, a third input type wherein all of the signal processing paths transmit the second type stream in the mixed mode, and a fourth input type in which at least two processing paths transmit streams which are different from each other. The first type stream is a TS stream and the second type stream may be an IP stream.

The signaling information may further include at least one of information on whether to use mode adaptation and information on an ISSY mode, when at least one signal processing includes a TS stream.

As described above, according to various exemplary embodiments, various information on a PLP, i.e., a signal processing path through which data included in a transmission frame are transmitted through an L1 signaling, thereby improving performance of a receiving apparatus.

Figure 12:
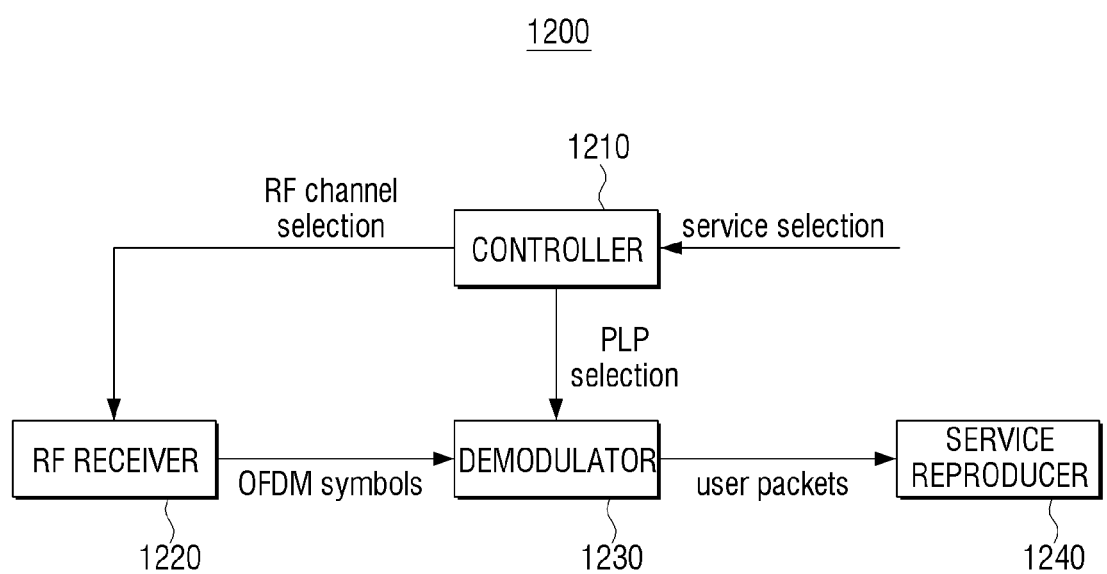
FIG. 12 is a block diagram illustrating a configuration of a receiving apparatus according to an exemplary embodiment.

FIG. 12 is a block diagram illustrating a configuration of a receiving apparatus according to an exemplary embodiment.

Referring to FIG. 12, a receiving apparatus 1210 may comprise a controller 1210, an RF receiver 1220, a demodulator 1230 and a service regenerator 1240.

The receiving apparatus 1210 determines an RF channel and a PLP through which a selected service is transmitted. The RF channel may be identified by a center frequency and a bandwidth, and the PLP may be identified by its PLP ID. A specific service may be transmitted through at least one PLP included in at least one RF channel, for each component constituting the specific service. Hereinafter, for the sake of convenience of explanation, it is assumed that all of data needed to play back one service is transmitted as one PLP which is transmitted through one RF channel. In other words, a service has only one data obtaining path to reproduce the service, and the data obtaining path is identified by an RF channel and a PLP.

The RF receiver 1220 detects an RF signal from an RF channel selected by a controller 1210 and delivers OFDM symbols, which are extracted by performing signal processing on the RF signal, to the demodulator 1230. Herein, the signal processing may include synchronization, channel estimation, equalization, etc. Information required for the signal processing may be a value predetermined by the receiving apparatus 1210 and a transmitter according to use and implementation thereof and included in a predetermined OFDM symbol among the OFDM symbols and then transmitted to the receiving apparatus.

The demodulator 1230 performs signal processing on the OFDM symbols, extracts user packet and delivers the user packet to a service reproducer 1240, and the service reproducer 1240 uses the user packet to reproduce and then output a service selected by a user. Here, a format of the user packet may differ depending on a service implementation method and may be, for example, a TS packet or a IPv4 packet.

Figure 13:
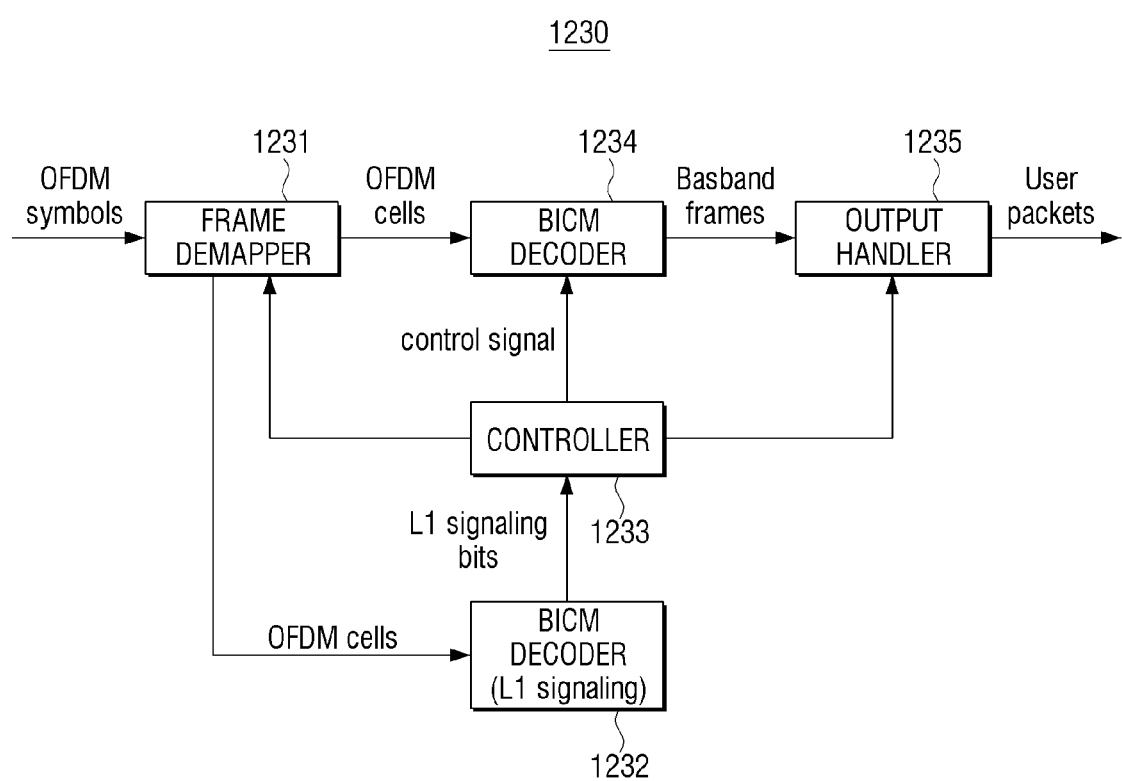
FIG. 13 is a block diagram illustrating a demodulator according to an exemplary embodiment.

FIG. 13 is a block diagram illustrating a demodulator according to an exemplary embodiment.

Referring to FIG. 13, a demodulator 1230 may include a frame demapper 1231, a BICM decoder 1232 for L1 signaling, a controller 1233, a BICM decoder 1234 and an output handler 1235.

The frame demapper 1231 selects a plurality of OFDM cells constituting an FEC block which belongs to a selected PLP in a frame including OFDM symbols, based on control information from the controller 1233, and provides the selected OFDM cells to the BICM decoder 1234. The frame demapper 1231 also selects a plurality of OFDM cells corresponding to at least one FEC block which includes L1 signaling, and delivers the selected OFDM cells to the BICM decoder 1230 for L1 signaling.

The BICM decoder for L1 signaling 1232 performs signal processing on an OFDM cell corresponding to an FEC block which includes L1 signaling, extracts L1 signaling bits and delivers the L1 signaling bits to the controller 1233. In this case, the signal processing may include an operation of extracting an LLR value for decoding an LDPC codeword and a process of using the extracted LLR value to decode the LDPC codeword.

The controller 1233 extracts an L1 signaling table from the L1 signaling bits and uses the L1 signaling table value to control operations of the frame demapper 1231, the BICM decoder 1234 and the output handler 1235. FIG. 13 illustrates that the BICM decoder 1232 for L1 signaling 1232 does not use control information of the controller 1233. However, when the L1 signaling has a layer structure similar to the layer structure of the above-described L1 pre signaling and L1 post signaling, it is obvious that the BICM decoder 1232 for L1 signaling may be constituted by at least one BICM decoding block, and operation of this BICM decoding block and the frame demapper 1231 may be controlled by L1 signaling information of an upper layer.

The BICM decoder 1234 performs signal processing on the OFDM cells constituting FEC blocks which belong to a selected PLP to extract BBFs and delivers the BBFs to the output handler 1235. In this case, the signal processing may include an operation of extracting an LLR value for decoding an LDPC codeword and an operation of using the extracted LLR value to decode the LDPC codeword, which may be performed based on control information output from the controller 1233.

The output handler 1235 performs signal processing on a BBF, extracts a user packet and delivers the extracted user packet to a service reproducer. In this case, the signal processing may be performed based on control information output from the controller 1233.

According to an exemplary embodiment, the L1 signaling includes information on a kind of a user packet transmitted through a corresponding PLP and information on operations used for encapsulating the user packet in a BBF. The foregoing information may be included in the control information which the controller 1233 outputs to the output handler 1235. The output handler 1235 extracts the user packet from the BBF received based on the control information.

According to an exemplary embodiment, the L1 signaling may include, in particular, information on an ISSY mode, information on a buffer size of a receiver required according to the ISSY mode and information on the time when a first user packet of a corresponding PLP included in a frame. The foregoing information may be included in the control information which the controller 1233 outputs to the output handler 1235. The output handler 1235 stores the control information in a buffer based on the control information and delivers the user packet to a service reproducer at a predetermined time.

Figure 14:
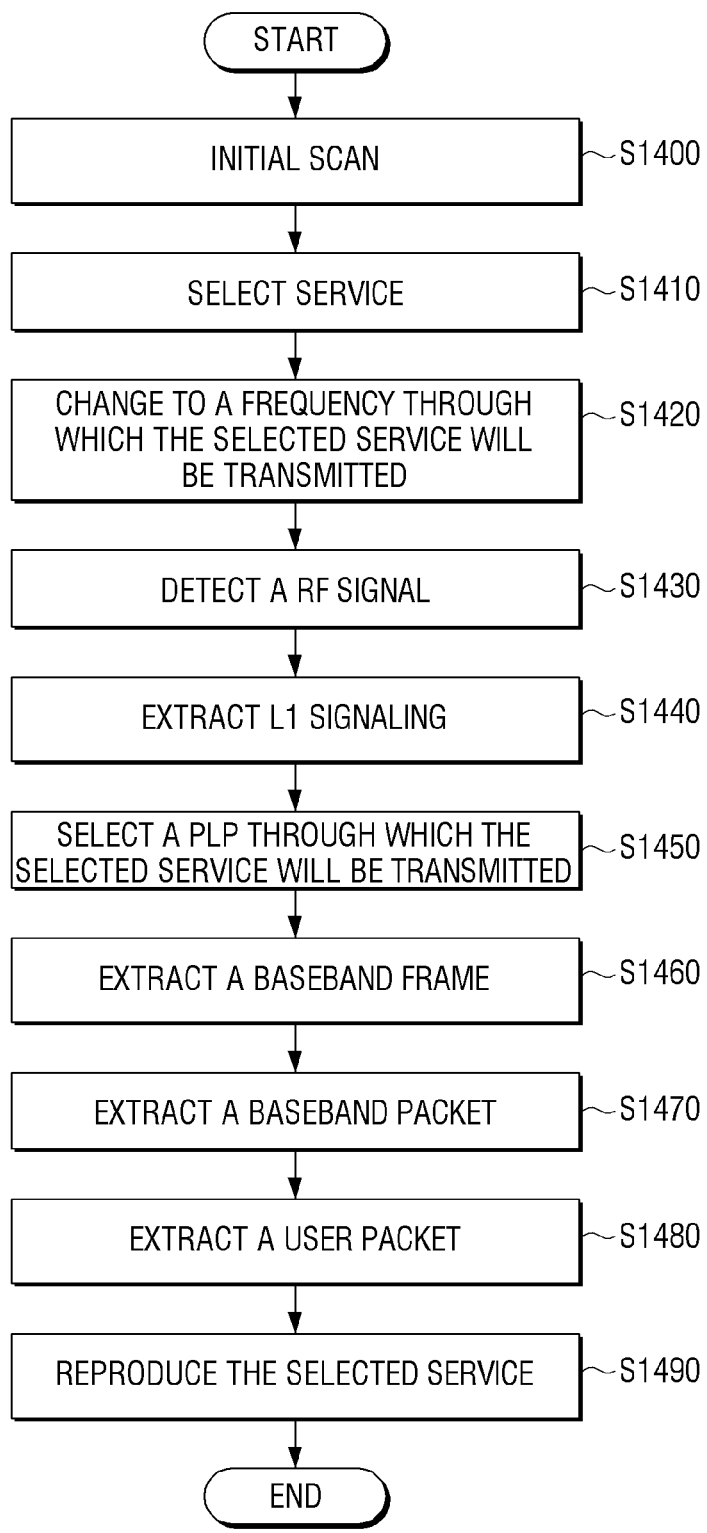
FIG. 14 is a flowchart provided to illustrate an operation of a receiving apparatus from a moment when a user selects a service until the selected service is reproduced, according to an exemplary embodiment.

FIG. 14 is a flowchart provided to illustrate an operation of a receiving apparatus from a moment when a user selects a service until the selected service is reproduced, according to an exemplary embodiment.

It is assumed that service information on all services selectable by a user are acquired at an initial scan (S1400) prior to the user's service selection (S1410). Service information may include information on a RF channel and a PLP which transmits data required to reproduce a specific service in a current receiving apparatus. As an example of the service information, program specific information/service information (PSI/SI) in an MPEG2-TS is available, and normally can be achieved through L2 signaling and an upper-layer signaling.

In the initial scan (S1400), comprehensive information on a payload type of PLPs which are transmitted to a specific frequency band. As an example, there may be information on whether every PLP transmitted to the frequency band includes a specific type of data.

When the user selects a service (S1410), the receiving apparatus transforms the selected service to a transmitting frequency and performs RF signaling detection (S1430). In the frequency transforming operation (S1420), the service information may be used.

When an RF signal is detected, the receiving apparatus performs an L1 signaling extracting operation from the detected RF signal (S1440). Then, the receiving apparatus selects a PLP transmitting the selected service, based on the extracted L1 signaling (S1450), and extracts a BBF from the selected PLP (S1460). In these operations, the service information may be used.

The operation to extract a BBF (S1460) may include an operation of demapping the transmitted frame and selecting OFDM cells included in a PLP, an operation of extracting an LLR value for LDPC coding/decoding from an OFDM cell, and an operation of decoding the LDPC codeword using the extracted LLR value.

The receiving apparatus, using header information of an extracted BBF, extracts a BBP from the BBF (S1470). The receiving apparatus also uses header information of an extracted BBP to extract a user packet from the extracted BBP (S1480). The extracted user packet is used to reproduce the selected service (S1490). In the BBP extraction operation (S1470) and user packet extraction operation (S1480), L1 signaling information extracted in the L1 signaling extraction operation (S1440) may be used.

According to an exemplary embodiment, the L1 signaling information includes information on types of a user packet transmitted through a corresponding PLP, and information on an operation used to encapsulate the user packet in a BBF. The foregoing information may be used in the user packet extraction operation (S1480). Specifically, this information may be used in an operation of extracting the user packet which is a reverse operation of encapsulation of the user packet in the BBF.

According to an exemplary embodiment, the L1 signaling may include information on an ISSY mode, a buffer size of the receiving apparatus required according to the ISSY mode information, and an output time of the first user packet of a corresponding PLP included in a frame. This L1 signaling information may be used to control a buffer in the user packet extraction operation (S1480). Specifically, this information may be used to control a buffer size to hold the extracted user packet and the time to output the user packet to a service reproducer.

A non-transitory computer readable medium may be provided which stores a program to operate the above-described signal processing methods according to an exemplary embodiment.

The non-transitory recordable medium refers to a medium which may store data semi-permanently rather than storing data for a short time such as a register, a cache, and a memory and may be readable by an apparatus. Specifically, this medium may be a non-temporal recordable medium such as compact disk (CD), digital versatile disk (DVD), hard disk, Blu-ray disk, universal serial bus (USB), memory card, or read-only memory (ROM), not being limited thereto.

The components, elements, modules or units represented by a block as illustrated in FIGS. 1, 2, 4, 5, 8A, 8B, 9, 12 and 13 may be embodied as various numbers of hardware, software and/or firmware structures that execute respective functions described above, according to an exemplary embodiment. For example, these components, elements, modules or units may use a direct circuit structure, such as a memory, processing, logic, a look-up table, etc. that may execute the respective functions through controls of one or more microprocessors or other control apparatuses. Also, these components, elements, modules or units may be specifically embodied by a program or a part of code, which contains one or more executable instructions for performing specified logic functions. Also, at least one of these components, elements, modules or units may further include a processor such as a central processing unit (CPU) that performs the respective functions, a microprocessor, or the like. A bus is not illustrated in the above block diagrams of FIGS. 1, 2, 4, 5, 8A, 8B, 9, 12 and 13. However, communications between the respective components, elements, modules or units may be carried out through the bus.

The foregoing embodiments and advantages are merely exemplary and should not be construed as limiting the inventive concept. Also, the description of the exemplary embodiments of the inventive concept is intended to be illustrative, and not to limit the scope of the claims, and many alternatives, modifications, and variations will be apparent to those skilled in the art.

What is claimed is:

1. A transmitting apparatus comprising:
   a frame generator configured to map data contained in at least one input stream to at least one physical layer pipe (PLP) to generate a frame;
   an information inserter configured to insert signaling information in a signaling region of the frame; and
   a transmitter configured to transmit the frame in which the signaling information is inserted,
   wherein the signaling information comprises information on an input type of each of the at least one input stream and information on a type of data which is mapped to the at least one PLP, and wherein the information on the input type indicates a type of input stream carried by every PLP in the current super-frame.

2. The transmitting apparatus of claim 1, wherein the information on the input type comprises information on whether all of PLPs in the frame are the same input type.

3. The transmitting apparatus of claim 1, wherein the information on the input type comprises information on at least one of a first input type in which all of PLPs in the frame transmit only a first type stream in a standalone mode, a second input type in which all of the PLPs transmit the first type stream and a second type stream which is different from the first type stream in a mixed mode, a third input type in which all of the PLPs transmit the second type stream in the mixed mode, and a fourth input type in which at least two processing paths transmit streams which are different from each other.

4. The transmitting apparatus of claim 3, wherein the first type stream is a transport stream (TS) and the second type stream includes an Internet packet (IP) stream.

5. The transmitting apparatus of claim 1, wherein the signaling information further comprises:
at least one of information on whether to use a mode adaptation and information on an input stream synchronizer (ISSY) mode, when the at least one PLP includes a transport stream (TS).

6. The transmitting apparatus as claimed in claim 1, wherein the signaling region comprises a layer 1 (L1) pre signaling region and an L1 post signaling region, and
wherein the information on the input type of each of the at least one input stream is included in the L1 pre signaling region, and the information on the data type is included in the L1 post signaling region.

7. The transmitting apparatus as claimed in claim 6, wherein the L1 post signaling region comprises a configurable field and a dynamic field, and
wherein the information on the data type is included in the configurable field.

8. A receiving apparatus comprising:
a receiver configured to receive a frame comprising signaling information and data which is mapped to at least one physical layer pipe (PLP);
a signaling processor configured to extract the signaling information from the received frame; and
a signal processor configured to perform signal processing on the data included in the frame based on the extracted signaling information,
wherein the signaling information comprises information on an input type of each of the at least one input stream at a transmitter of the frame and information on a type of the data which is mapped to the at least one PLP, and
wherein the information on the input type indicates a type of input stream carried by every PLP in the current super-frame.

9. The receiving apparatus of claim 8, wherein the information on the input type comprises information on whether all of PLPs in the frame are the same input type.

10. The receiving apparatus of claim 8, wherein the information on the input type comprises information on at least one of a first input type in which all of PLPs in the frame transmit only a first type stream in a standalone mode, a second input type in which all of the PLPs transmit the first type stream and a second type stream which is different from the first type stream in a mixed mode, a third input type in which all of the PLPs transmit the second type stream in the mixed mode, and a fourth input type in which at least two processing paths transmit streams which are different from each other.

11. The receiving apparatus of claim 10, wherein the first type stream is a transport stream (TS) and the second type streams includes an Internet packet (IP) stream.

12. The receiving apparatus of claim 8, wherein the signaling information further comprises:
at least one of information on whether to use a mode adaptation and information on an input stream synchronizer (ISSY) mode, when the at least one PLP includes a transport stream (TS).

13. A signal processing method comprising:
mapping data contained in at least one input stream to at least one physical layer pipe (PLP) to generate a frame;
insert signaling information in a signaling region of the frame; and
transmitting the frame in which the signaling information is inserted,
wherein the signaling information comprises information on an input type of each of the at least one input stream and information on a type of data which is mapped to the at least one PLP, and
wherein the information on the input type indicates a type of input stream carried by every PLP in the current super-frame.

14. The signal processing method of claim 13, wherein the information on the input type comprises information on whether all of PLPs in the frame are the same input type.

15. The signal processing method of claim 13, wherein the information on the input type comprises information on at least one of a first input type in which all of PLPs in the frame transmit only a first type stream in a standalone mode, a second input type in which all of the PLPs transmit the first type stream and a second type stream which is different from the first type stream in a mixed mode, a third input type in which all of the PLPs transmit the second type stream in the mixed mode, and a fourth input type in which at least two processing paths transmit streams which are different from each other.

16. The signal processing method of claim 15, wherein the first type stream is a transport stream (TS) and the second type streams includes an Internet packet (IP) stream.

17. The signal processing method of claim 13, wherein the signaling information further comprises:
at least one of information on whether to use a mode adaptation and information on an input stream synchronizer (ISSY) mode, when the at least one PLP includes a transport stream (TS).

18. The signal processing method of claim 13, wherein the signaling region comprises a layer 1 (L1) pre signaling region and an L1 post signaling region, and
wherein the information on the input type of each of the at least one input stream is included in the L1 pre signaling region, and the information on the data type is included in the L1 post signaling region.

19. The signal processing method of claim 18, wherein the L1 post signaling region comprises a configurable field and a dynamic field, and
wherein the information on the data type is included in the configurable field.

20. A signal processing method comprising:
receiving a frame comprising signaling information and data which is mapped to at least one physical layer pipe (PLP);
extracting the signaling information from the received frame; and performing signal processing on the data included in the frame based on the extracted signaling information, wherein the signaling information comprises information on an input type of each of the at least one input stream at a transmitter of the frame and information on a type of the data which is mapped to the at least one PLP, and wherein the information on the input type indicates a type of input stream carried by every PLP in the current super-frame.

* * * * *